March 8, 1932. L. JAENICHEN 1,849,009

TARE COMPENSATING DEVICE

Original Filed Aug. 6, 1927 2 Sheets-Sheet 1

INVENTOR.
Louis Jaenichen
BY
Francis D. Hardesty
ATTORNEY.

March 8, 1932.  L. JAENICHEN  1,849,009

TARE COMPENSATING DEVICE

Original Filed Aug. 6, 1927  2 Sheets-Sheet 2

INVENTOR.
Louis Jaenichen
BY Francis D Hardesty
ATTORNEY.

Patented Mar. 8, 1932

1,849,009

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

TARE COMPENSATING DEVICE

Original application filed August 6, 1927, Serial No. 211,188. Divided and this application filed April 13, 1931. Serial No. 529,632.

This invention relates to scales, and more particularly to tare compensating means for scales.

An object of the invention is a tare compensating means such as that disclosed in my prior copending application, Ser. No. 211,188, filed August 6, 1927, of which this case is a division.

A further object is a tare compensating means including a vertically movable plate to which the upper end of a scale load spring is anchored, the plate when moved vertically, serving to elevate the tare tensioned spring, and the lever, without affecting the tare tension of the spring, and thus serving to return the weight indicating means to its zero position.

Still further objects will readily occur to those skilled in the art upon reference to the following description and the accompanying drawings in which Fig. 1 is a side view of the scale, indicator and weighing parts being omitted for purposes of clarity.

Fig. 4 is a diagrammatic view of the scale.

Figure 1:
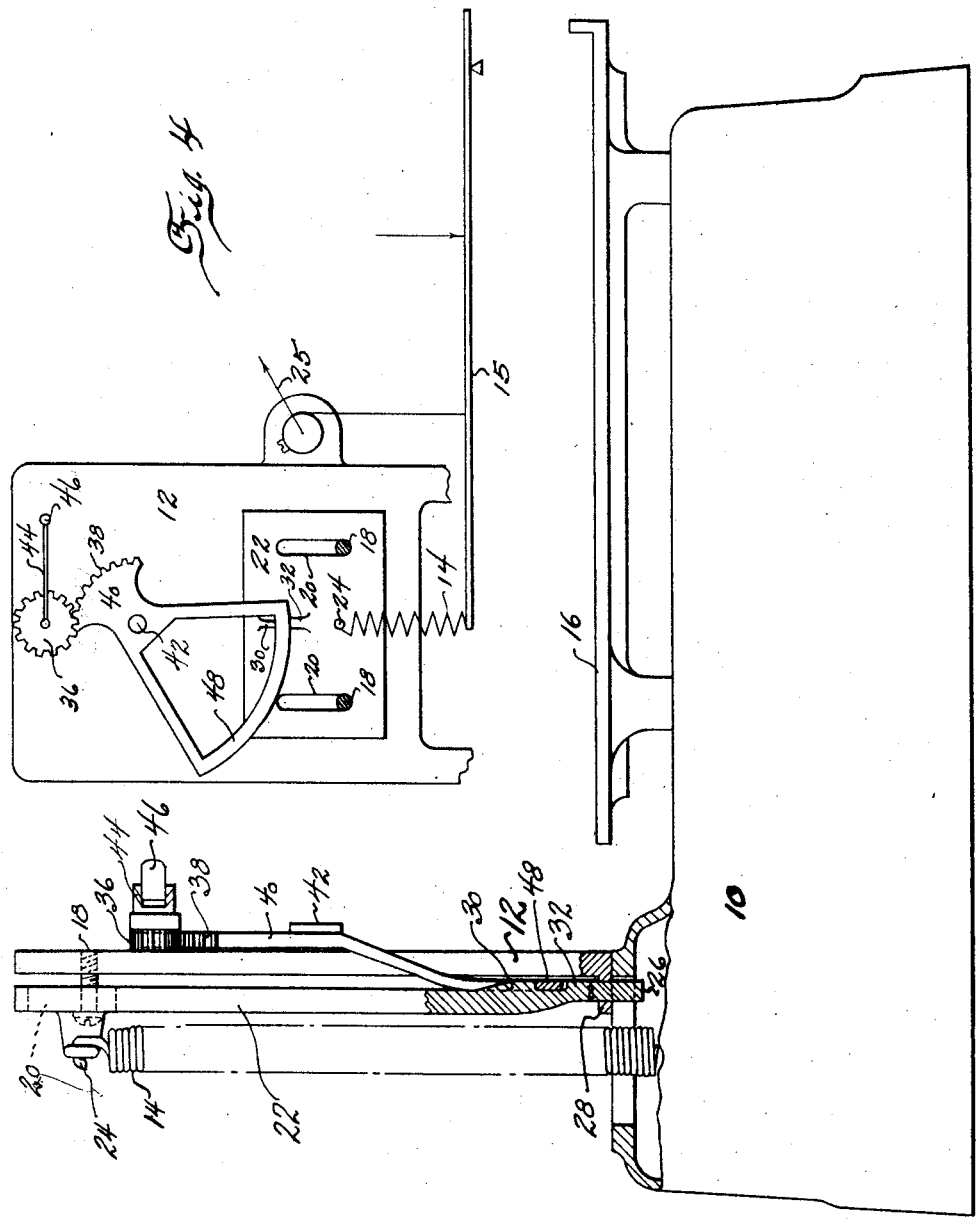
Figure 2:
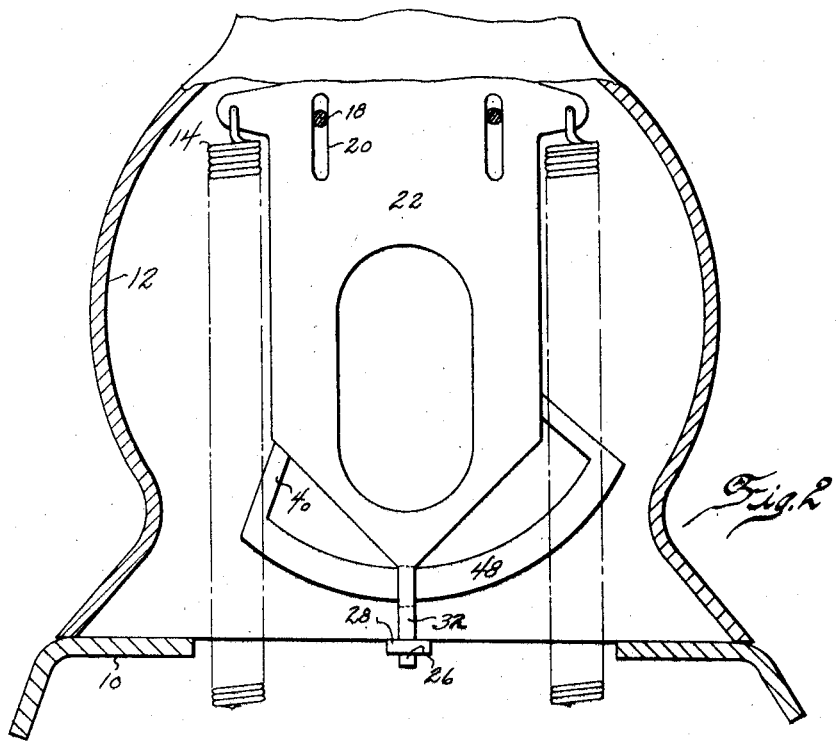
Fig. 2 is a partial rear view of the vertical frame.
Figure 3:
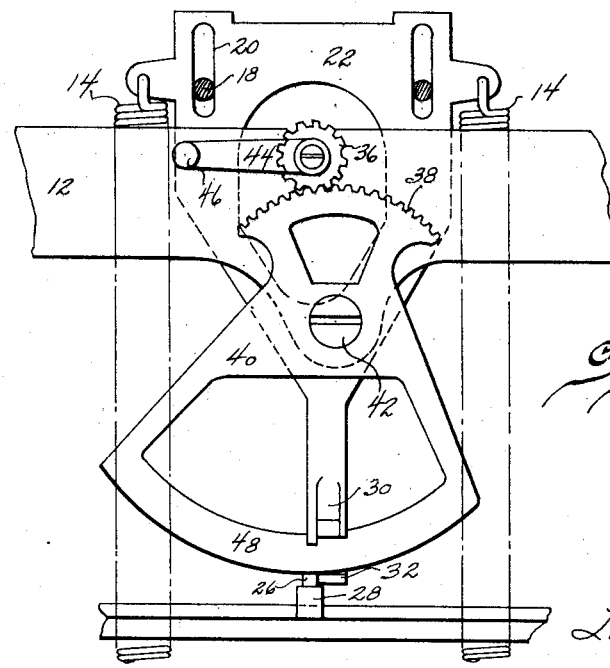
Fig. 3 is a partial front view of the vertical frame.

Referring to the drawings, it will be seen that the base 10 supports a vertical frame 12 upon which indicator mechanism, shown diagrammatically in Fig. 4, and the tare arrangement forming the invention of this case, are supported and behind which the load springs 14 are disposed. Within the base is the weighing mechanism, including a lever 15, the same being operatively connected to the load springs 14 and to the weighing platform 16.

Threaded into the upper end of the frame 12 are pins 18 which are received in guide slots 20 in the plate 22. To the plate the upper hooked ends 24 of the load springs 14 are connected. The plate at its lower end is provided with an extension 26 slidably mounted in a guide lug 28 formed as part of the frame 12 and is further provided with spaced lugs 30 and 32 for purposes to be described. In order to compensate for tare, the plate 22 may be moved vertically to raise the tare tensioned load springs and the weighing mechanism, whereupon the pointer 25 will move automatically from its tare position back to zero. The means for vertically moving the plate 22 will now be described.

Journalled on the frame 12, near its upper end is a pinion 36 in meshing relation with rack teeth 38 formed on the upper edge of a cam plate 40, the latter being journalled at 42 on the frame 12. The pinion is provided with an operating crank 44 having a handle 46 whereby the pinion may be rotated to rotate the cam plate. The lower part of the cam plate includes a cross piece 48 disposed between the tare plate lugs 30 and 32, and when the cam plate is rotated, the engagement of the part 48 with the lugs 30 and 32 moves the plate 22, as desired.

The tare operation of the device is as follows: When a load is placed upon the platform 16, the lever 15 will move down, tensioning the springs and moving the pointer to its tare position. The crank 44 is then rotated to elevate the plate 22 whereupon the springs, while tensioned, and the lever 15 will move upwardly as a unit, permitting the pointer 25 to return to its zero position.

Other means may be used to elevate the upper ends of the tensioned springs, if desired, without departing from the spirit of the invention.

Now having described the invention and the preferred embodiment thereof, it is to be understood that the said invention is to be limited, not to the specific details herein set forth but only by the scope of the claims which follow.

What I claim is:

1. In a scale having a horizontal base and a vertical frame, a load supporting weighing lever in said base, indicator mechanism operable by said lever, a tare device slidably mounted on said frame, a load spring having its lower end operatively connected to said lever and its upper end operatively connected to said tare device, and means for vertically moving said tare means, said tare device moving means including a cam plate engaging said tare device and manually operable means for rotating said cam plate.

2. In a scale having a horizontal base and a vertical frame, a load supporting weighing lever in said base, indicator mechanism operable by said lever, a tare device slidably mounted on said frame, a load spring having its lower end operatively connected to said lever and its upper end operatively connected to said tare device, and means for vertically moving said tare means, said tare device moving means including a cam plate engaging said tare device and journalled on said frame and manually operable means for rotating said cam plate.

In testimony whereof, I sign this specification.

LOUIS JAENICHEN.